(12) United States Patent
Keller et al.

(10) Patent No.: US 11,231,266 B1
(45) Date of Patent: Jan. 25, 2022

(54) DEFORMABLE SIGNALING PATHWAYS

(71) Applicant: Facebook Technologies, LLC, Menlo Park, CA (US)

(72) Inventors: Sean Jason Keller, Bellevue, WA (US); David R. Perek, Seattle, WA (US); Tristan Thomas Trutna, Seattle, WA (US); Garett Andrew Ochs, Seattle, WA (US); Nicholas Roy Corson, Woodinville, WA (US); Raymond King, Woodinville, WA (US); Vincenzo Casasanta, III, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 230 days.

(21) Appl. No.: 16/710,607

(22) Filed: Dec. 11, 2019

Related U.S. Application Data

(63) Continuation of application No. 15/718,127, filed on Sep. 28, 2017, now Pat. No. 10,557,699.

(51) Int. Cl.
*G01B 7/16* (2006.01)
*H01R 4/50* (2006.01)
*H01B 7/00* (2006.01)
*G06F 3/01* (2006.01)
*H01R 4/48* (2006.01)
*H01B 7/04* (2006.01)

(52) U.S. Cl.
CPC .............. *G01B 7/18* (2013.01); *G06F 3/014* (2013.01); *H01B 7/0009* (2013.01); *H01B 7/04* (2013.01); *H01R 4/4809* (2013.01); *H01R 4/5008* (2013.01)

(58) Field of Classification Search
CPC .... G06F 3/0448; G06F 3/0447; G06F 3/0446; G06F 3/0445; G06F 3/0444; G06F 3/0443; G06F 3/0442; G06F 3/0441; G06F 3/044; G06F 3/0428; G01R 27/2605
See application file for complete search history.

(56) References Cited

U.S. PATENT DOCUMENTS

| 2017/0157488 A1* | 6/2017 | Migliorati | .......... A63B 71/0605 |
| 2017/0176267 A1* | 6/2017 | Keller | .................... G01L 1/146 |

\* cited by examiner

*Primary Examiner* — Tung X Nguyen
(74) *Attorney, Agent, or Firm* — Fenwick & West LLP (57) ABSTRACT

A wearable device comprises one or more deformable signaling pathways wherein each deformable signaling pathway is configured to enable an electrical connection between two devices electrically connected to each other via the deformable signaling pathway. Deformable signaling pathways enable the conduction of electrical signals between various circuit elements similar to one or more circuit elements such as electronic traces or wires. A deformable signaling pathway includes one or more conductive elements surrounded by a conductive gel. Both the conductive gel and the one or more conductive elements are encased in an elastomeric shell. The elastomeric shell is attached to terminals (e.g., one on either end). The one or more connectors are attached to one another such that the one or more connectors span the length of the elastomeric shell and form a low resistance contact between the terminals of the deformable signaling pathway.

20 Claims, 6 Drawing Sheets

DEFORMABLE SIGNALING PATHWAYS

CROSS REFERENCE TO RELATED APPLICATIONS

This application is a continuation of U.S. application Ser. No. 15/718,127, filed Sep. 28, 2017 now U.S. Pat. No. 10,557,699, which is incorporated by reference in its entirety.

BACKGROUND

The present disclosure relates, generally, to wearable signaling pathways that are resistant to failure under the application of repeated cycles of stress and strain. More specifically, the disclosure relates to deformable signal pathways for use in a wearable device.

Virtual Reality (VR) is a simulated environment related by computer technology and presented to a user through a VR system. In some VR systems, a user interacts with virtual objects using a wearable device (e.g., a glove). Conventional wearable devices can detract from a user's experience with a VR system, as the connections between various components on the wearable electrical devices are prone to failure due to repeated use. Thus, electronics on virtual devices need to be electrically connected signaling pathways are connected to one another via traditional connectors which are not prone to fatigue and failure under multiple cycles of bend and relaxation.

SUMMARY

Embodiments of the disclosed subject matter include deformable signaling pathways used in virtual reality (VR) systems, augmented reality (AR) systems, and/or mixed reality (MR) systems. Deformable signaling pathways enable the conduction of electrical signals between various circuit elements similar to one or more circuit elements such as electronic traces or wires. In some embodiments, deformable signaling pathways are used in conjunction with one or more sensors and controllers in order to enable communication, actuation, and/or sensing for a haptic apparatus on a wearable device (e.g., a haptic glove) for a VR system. In still other embodiments, deformable signaling pathways are modular. That is, one or more deformable signaling pathways may be coupled together with other elements to form a composite haptic device.

One example of a deformable signaling pathway is a deformable wire, which enables the formation of an electrical contact between two or more devices electrically connected to one another via the deformable signaling pathway (e.g., one at each terminal). For example devices electrically connected via a deformable signaling pathway include one or more haptic devices such as vibrators, actuators, sensors or any combination of thereof. It should be noted that in one or more embodiments, the formation of an electrical contact via a deformable signaling pathway results in the formation of a two-way connection between two or more devices electrically connected via the deformable signaling pathway. That is, the deformable signaling pathway may enable a controller to transmit and receive currents, voltages, or any combination thereof via a deformable signaling pathway. A deformable signaling pathway includes one or more connectors surrounded by a conductive gel. Both the conductive gel and the one or more connectors are encased in a shell. The shell is attached to terminals (e.g., one on either end). The one or more connectors are attached to one another such that the one or more connectors span the length of the elastomeric shell and form a low resistance contact between the terminals of the deformable signaling pathway. In one or more embodiments, each connector includes a mechanical fastener comprising a hemispherical tip and a slit. In various embodiments, the slit is, for example, a rectangular or a trapezoidal in shape. Typically, two adjacent connectors may be coupled to one another by threading the mechanical fastener associated with a first connector through the slit of a second connector. In this way, the coupled mechanical connectors form a chain. In an embodiment, a chain of two or more connectors coupled to one another spans the length of the elastomeric shell. In other embodiments, the slit is rectangular slit, or circular. In an embodiment, the two connectors are connected in this way may have two degrees of freedom (e.g., sliding left and right along the slit and into and out of the pane of the mechanical connector).

The shell is may be comprised of one or more elastomeric materials. In one or more embodiments, the gel may be a hydrogel, an organogel, or some combination thereof. In one or more embodiments, the conductive gel surrounding the connectors suspends a plurality of conductive particles. The connectors are constructed out of KAPTON and coated with a conductive coating (e.g., gold).

In various embodiments, a deformable signaling pathway is additionally coupled with a controller. The controller comprises a driver circuit for generating and propagating the appropriate voltage across the deformable signaling assembly, a data store for storing instructions including one or more calibration parameters, and an interface for communicating with the VR system. In various embodiments, the driver circuit includes a digital to analog converter, a processor, or any combination thereof.

In another example embodiment, a deformation of the signaling pathway presents a measurable change in resistance measured across the deformation sensor under the application of an external stress, strain, or any combination thereof. In this embodiment, the driver circuit associated with the controller additionally comprises circuitry to measure the resistance across the deformable signaling pathway. For example, the driver circuit additionally includes one or more voltage and current sources as well as an analog to digital converter (ADC) in order to apply the appropriate voltage and/or current waveform across the deformable signaling pathway and measure a change in resistance.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
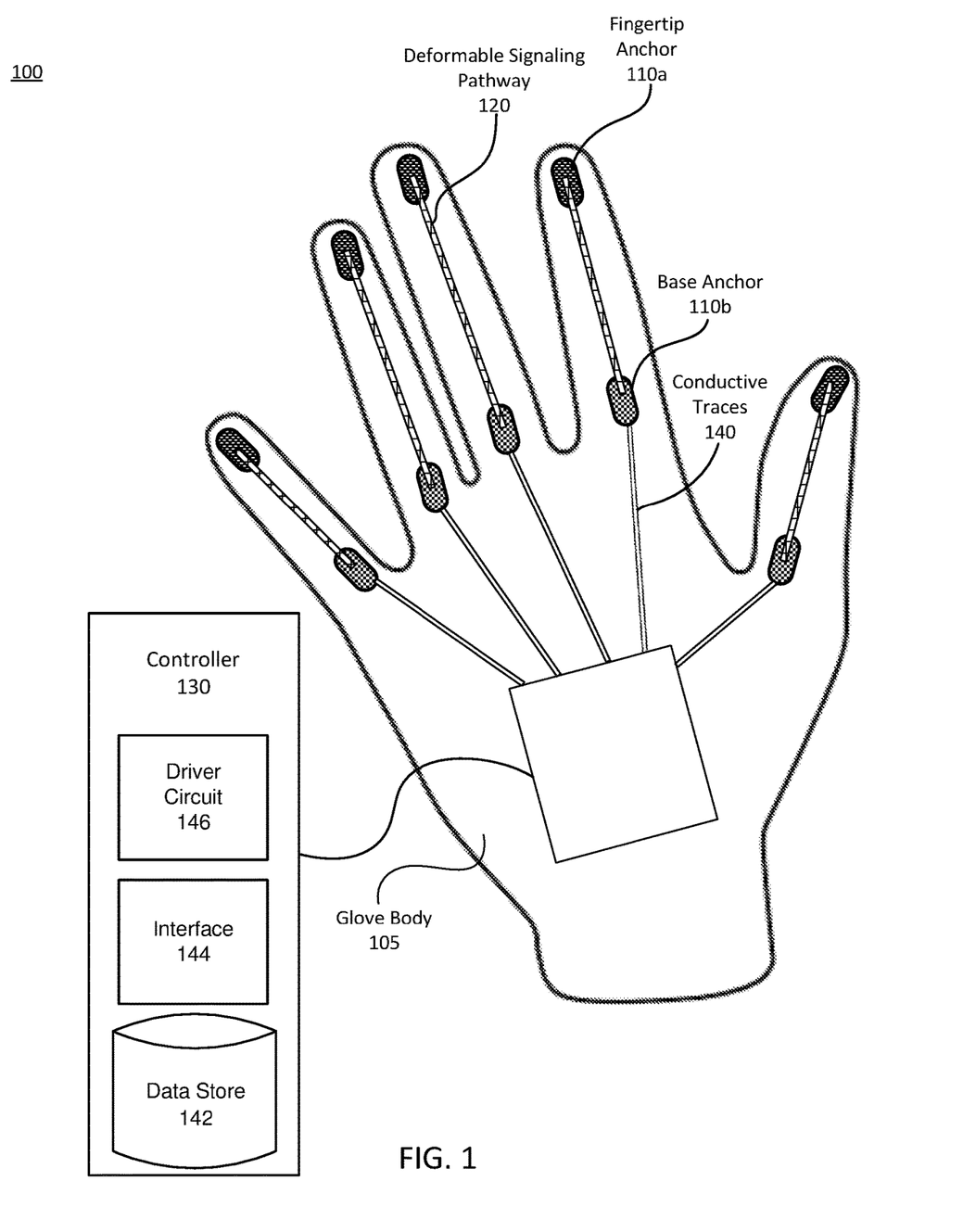
FIG. 1 illustrates a wearable accessory including a plurality of deformable signaling pathways attached to portions of a glove body, in accordance with an embodiment.

FIG. 1 illustrates a wearable accessory 100 including a plurality of deformable signaling pathways 120 attached to portions of a glove body 105, in accordance with an embodiment. The wearable accessory 100 may be used as part of, e.g., a system for interacting with virtual objects in a virtual environment. The wearable accessory 100 illustrated in FIG. 1 includes the glove body 105, a plurality of deformable signaling pathways 120, and a controller 130.

The glove body 105 represents a glove worn by a user that provides inputs to the VR system. In various embodiments, the glove body 105 comprises an elastomer substrate (e.g., a flexible fiber or other flexible material such as rubber or skin) configured to bend and/or flex with the user as the user interacts with a virtual object. For example, if the user grabs a virtual apple in a VR environment, the glove body 105 is configured to deform in conjunction to the user's hand in order to mimic a "grabbing" action. In another example, if a user throws an object in a virtual environment the glove body 105 is configured to deform with respect to the user's hand in order to mimic a "throwing" action.

The glove body 105 may also contain one or more anchors configured to anchor a deformable signaling pathway 120 to the substrate. In FIG. 1, the glove body 105 comprises a fingertip anchor 110a and a base anchor 110b on each of the fingers of the glove body 105. Both the fingertip anchor 110a and base anchor 110b, are configured to anchor the deformable signaling pathway 120 to the glove body 105. In another embodiment, there is no glove body 105 and the fingertip anchor 110a and base anchor 110b couple directly to the user's skin. In still other embodiments, the glove body 105, itself, is the user's skin and the fingertip anchor 110a and the base anchor 110b attach the deformable signaling pathway 120 directly to the user's hand. In this embodiment, the anchors comprise straps or adhesive tape. It should also be noted, that in various other embodiments, there may be more or fewer anchors configured to couple a deformable signaling pathway 120 to the user's finger or to a glove body 105.

In FIG. 1, each deformable signaling pathway 120 is connected to the controller 130 through flexible conductive traces 140. The flexible conductive traces 140 may comprise thin metallic traces, or some other flexible conductive compound. In one example embodiment, each of the flexible conductive traces 140 depicted in FIG. 1 is a deformable signaling pathway 120. In still other example embodiments, each of the flexible conductive traces 140 are an arrangement of one or more deformable signaling pathways 120 connected together, or any combination of deformable signaling pathways 120 and flexible conductive traces 140.

A deformable signaling pathway 120 enables a low-resistance electrical connection between two electrical elements connected together via the deformable signaling pathway 120. For example, the deformable signaling pathway 120 may present a resistance between 0 Ohms ($\Omega$) and 1,000$\Omega$. The deformable signaling pathway 120 is resistant to random changes in electrical resistance measured across the deformable signaling pathway caused by fatigue and/or failure due to repeated applications of stress, strain caused by repeated blending, flexing or any combination thereof. The deformable signaling pathway 120 is further described below in conjunction with FIGS. 2A-4C.

In another embodiment, the deformable signaling assembly 120 is configured to detect the magnitude of an applied stress or strain (e.g., compression, bend, flex, stretch or any combination thereof). An applied stress or strain may result in a change in the magnitude of the electrical resistance measured across the deformable signaling pathway 120. For example, while a fully extended (e.g., no applied strain or stress) deformable signaling pathway 120 may present a resistance of 10$\Omega$, a bent or compressed (e.g., a non-zero applied strain) deformable signaling pathway 120 presents a resistance of 1$\Omega$. In other embodiments, the resistance of a deformable signaling pathway 120 may increase linearly with the magnitude of the applied strain.

The controller 130 allows the plurality of deformable signaling pathways 120 to communicate with a console; store instructions and measurements; generate and propagate waveforms down one or more deformable signaling pathways; and receive messages from one or more electrical devices connected to a deformable signaling pathway 120. In an embodiment, the controller 130 is also configured to measure the resistance of each of the one or more deformable signaling pathways 120. As shown in FIG. 1, the controller 130 is connected to each of the one or more deformable signaling pathways 120. In FIG. 1, the controller 130 comprises a data store 142, a driver circuit 146, and an interface 144. Some embodiments of the controller 130 may have additional or fewer modules than those described here. Similarly, the functions can be distributed among the modules in a different manner than is described here.

The data store 142 stores one or more measurements obtained by the driver circuit 146. For example, the data store 142 may store calibration instructions to account for temperature, and frequency. In other embodiments, the data store 142 may also store calibration instructions from the interface 146. Typically, calibration instructions stored in the data store 142 enable the controller 130 to account for changes to the electrical characteristics over time of the one or more deformable signaling pathways 120 attached to the controller 130. For example, the controller 130 performs a calibration at every power up and stores the current values of calibration parameters in the data store 142.

The controller 130 may also store the received one or more measurements in the data store 142. For example, the controller 130 receives measurements from the one or more electrical devices connected to it via a deformable signaling pathway 120. The received measurements may be represented as a <key, value> pair and stored in the data store 142. In various embodiments, the key may be sensorID associated with a sensor electrically connected to a deformable signaling pathway 120. Accordingly, the value associated with the sensorID may be a sensor value. In an example embodiment, value associated with the stored <key, value> pair is a text value, a pressure value, a stress value, resistance value, a voltage value, or a temperature value. A value associated with a particular <key, value> pair may be any measurement that can be measured by a sensor electrically connected to a deformable signaling assembly 120. Similarly, a key typically represents any electric device electrically connected to a deformable signaling pathway 120. For example, in still other embodiments, measurements stored in the data store 142 may be additionally associated with a time stamp.

The interface 144 facilitates communications between the VR system, the driver circuit 146, and the data store 142. In other embodiments, the VR system is an AR system or any combination of VR and AR systems. That is, the interface 144 is configured to receive one or more instructions to generate and transmit a sequence of voltages or currents across one or more of the deformable signaling pathways 120 attached to the controller 130. In one or more embodiments, the interface 144 is configured to map a received instruction to a digital or analog voltage representation. For example, a received instruction to "bend the index finger" may result in the generation of an instruction by the interface 144 to generate a voltage of 5 V and transmit this voltage across the deformable signaling pathway 120 associated with the index finger. In another example, an instruction to "make a fist" may result in the generation of a set of instructions by the interface 144 to generate a voltage of 5 V and transmit this voltage across each of the one or more deformable signaling pathways 120 connected to a controller 130. In other embodiments, the interface 144 receives a sequence of instructions separated by time from a console 510. The interface 144 may store one or more instructions received from the console 510 in the data store 142. The console 510 is further described below in conjunction with FIG. 5.

In still other embodiments, the interface 144 may receive instructions from the VR system comprising calibration instructions. The received calibration instructions may enable the configuration of the driver circuit 146. For example, the interface 144 may receive one or more instructions to modify the sample rate, sampling resolution. In other embodiments, the received calibration instructions are associated with one or more calibration parameters such as temperature sensitivity, model linearity associated with the mapping function. In one or more embodiments, the received calibration instructions and associated calibration parameters are stored in the data store 142 by the interface 144.

The interface 146 may communicate one or more measurements performed by a driver circuit 146 to a console. In various embodiments, the measurement communicated to the console is retrieved from the data store 142. The interface 146 may be coupled to the console via, e.g., a wired connection, a wireless connection, or both.

The driver circuit 146 generates voltage or current waveforms for transmission across each of the one or more deformable signaling pathways 120 connected to the controller 130. In one embodiment, the voltage or current waveforms are generated based on instructions received from the interface 144. In order to generate and transmit one or more current or voltage signals across a deformable signaling pathway 120, the driver circuit 146 includes a digital to analog converter (DAC), a current source, a voltage source, and a combination of circuit elements (e.g., resistors, inductors, capacitors, and transistors). The driver circuit 146 may also be configured to measure the impedance of each of the one or more deformable signaling pathways 120 and adjust the output voltage or current accordingly. For example, in response to a measured impedance across a deformable signaling pathway 120, the driver circuit 146 increases or decreases the magnitude of the generated voltage or current waveform. In some embodiments, the DAC associated with the driver circuit 146 is further configured with one or more calibration parameters.

In still other embodiments, the driver circuit 146 receives analog voltage waveforms from one or more electrical devices via a deformable signaling pathway 120. The driver circuit 146 is configured to process the received analog voltage waveform and determine an appropriate digital representation of the received analog voltage waveform. For example, the driver circuit 146 may include an analog to digital converter (ADC). The ADC processes a received analog voltage signal and converts the signal into its corresponding digital representation. The digital representation of the received voltage signal may be subsequently transmitted to a console 510 via the interface 144. The console 510 is further discussed below in below in conjunction with FIG. 5. In other embodiments, the determined digital representation is additionally or alternatively stored in the data store 142 as a <key, value> pair. The data store 142 is further described above.

The driver circuit 146 may also be configured to condition a voltage or current waveforms received via a deformable signaling pathways 120 associated with the controller 130. For example, the driver circuit 146 may include a combination of resistors, capacitors, inductors, active components (e.g., diodes and transistors) to render the circuit immune to an electrostatic discharge. The driver circuit 146 may also include one or more resistors, capacitors, inductors, processors, to provide the functionality of an electrical filter. For example, the driver circuit 146 includes a set of high and low pass filters to provide immunity to electromagnetic interference.

Figure 2A:
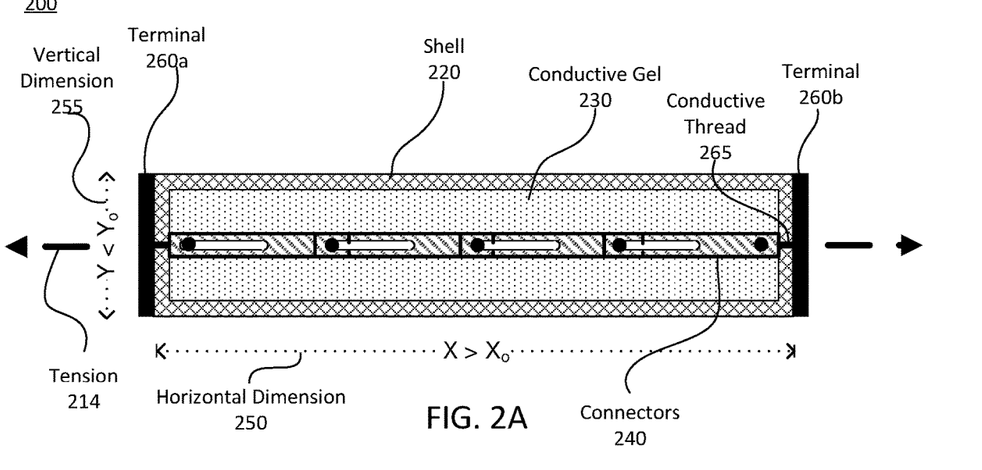
FIG. 2A illustrates a side-view of a single deformable signaling pathway deformed by the application of tension along a horizontal dimension, in accordance with an embodiment.

FIG. 2A illustrates a side-view of a single deformable signaling pathway 200 deformed by the application of tension 214 along a horizontal dimension 250, in accordance with an embodiment. In some embodiments, the deformable signaling pathway 200 is an embodiment of the deformable signaling pathway 120 depicted in FIG. 1. As shown in FIG. 2A, at equilibrium (e.g., no applied stress or strain) the deformable signaling pathway 200 has a nominal horizontal length $X_o$ along horizontal dimension 250 and a nominal vertical length $Y_o$ along vertical dimension 255. In FIG. 2A, the application of a tension 214 to the deformable signaling pathway 200 causes the horizontal length (e.g., width) of the deformable signaling pathway 200 to increase in the horizontal dimension 250 to some length X larger than the nominal horizontal length $X_o$. An increase in the horizontal length of the deformable signaling pathway 200 is associated with a corresponding decrease in the vertical length (e.g., height) of the deformable signaling pathway 200 along vertical dimension 255. In the example embodiment depicted in FIG. 2A the tension 214 causes the vertical length of the deformable signaling pathway 200 to decrease along vertical dimension 255 to some length Y less than the nominal vertical length $Y_o$. Generally, the horizontal length of the deformable signaling pathway 200 increases in response to the application of tension 214 in the horizontal dimension 250. Electrical contact between terminals 260a and 260b is maintained despite changes made in the horizontal length (e.g., increase or decrease) of the deformable signaling pathway 200.

The deformable signaling pathway 200 illustrated in FIG. 2A includes a shell 220, a conductive gel 230, a plurality of connectors 240, and terminals 260a and 260b. Responsive to an applied tension 214, the shell 220 generates restoring forces to relieve the effect of an applied tension (e.g., an increase the in the horizontal length). Typically, the restoring forces are directed towards a direction that restores the original size and shape of the shell 220. For example, the tension 214 depicted in FIG. 2A results in an increase in horizontal length X and a decrease in vertical length Y and the generated restoring forces are configured to return the deformable signaling pathway 200 to its size and shape at equilibrium (e.g., when no tension 240 is applied). In other embodiments, the horizontal dimension 250 and the vertical dimension 255 correspond to the x and y-axis in a Cartesian coordinate system, respectively. In these embodiments, responsive to an applied force, an increase (or decrease) in the horizontal length X may also be coupled with a decrease (or increase) in the depth (e.g., along the z-axis) of the deformable signaling pathway 200.

The shell 220 comprises a conductive gel 230. In embodiments where the conductive gel 230 includes a plurality of conductive particles, the conductive gel 230 is configured to suspend or dissolve a plurality of conductive particles. In an embodiment, the morphology of the conductive particles. In an example embodiment, the diameter of the conductive particles is in the range of 10 nanometers (nm) and 10 micrometers (μm). The conductive particles may be spherical particles comprised of graphite allotropes, and metals such silver, copper, or gold. Alternatively, each of the conductive particles includes an anisotropic phase with a dimensionally large aspect ratio (e.g., a carbon nanotube, a graphene sheet, a metal chalcogenide sheet, or a metal nanowire). Here, the conductive gel 230 may be electrically neutral or possess a cationic or anionic charge. In embodiments where the conductive gel 230 posse a cationic or anionic charge, the conductive gel 230 serves as a viscous carrier fluid or gel in which the conductive particles are suspended.-In other embodiments the conductive gel 230 has a viscosity in the range of 400 centipoise (cps) to $10^6$ cps. Typically, the conductivity of the conductive gel 230 will range from 0.1 Siemens/meter (S/m) to 100 S/m. In various other embodiments, the conductivity of the conductive gel 230 may be tuned by varying the concentration of the associated conductive particles.

Figure 3A:
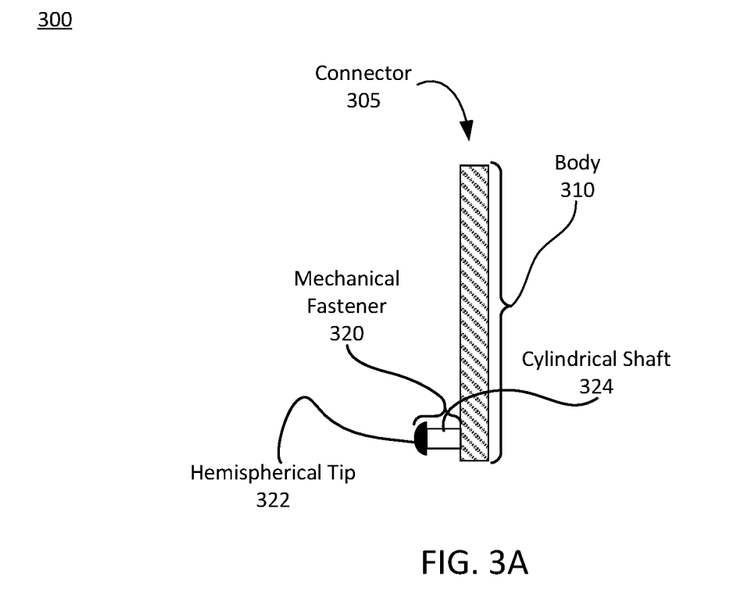
FIG. 3A, illustrates a side-view of a connector in accordance with an embodiment.

Embedded within the conductive gel 230 are a plurality of connectors 240. In various embodiments, each of the plurality of connectors 240 is coupled to its adjacent connector 240 forming a chain that spans the deformable signaling pathway 200 along horizontal dimension 250. In one or more embodiments, the chain of connectors 240 is configured to form a low resistance electric connection between terminals 260a and 260b via the conductive thread 265. The conductive thread 265 passes through the shell 220 and couples the chain of connectors 240 to terminals 260a and 260b. For example, a current applied to the deformable signaling pathway through terminal 260a propagates to terminal 260b along the chain of connectors 240. Similarly, in another example, if a voltage V1 is applied to terminal 260a, terminal 260b is also charged to the voltage V1. In the example above it should be noted that if both terminals 260a and 260b are charged to a voltage V1, the conductive thread 265 and each of connectors 240 in the chain of connectors 240 is also charged to the voltage V1. In other embodiments, there may be some restive loss across the conductive thread 265, and the chain of connectors 240. For example, the resistance of each connectors 240 is a value between 0Ω and a 1,000Ω. That is, if terminal 260a is charged to a voltage V1, terminal 260b is charged to a voltage V1-V2 where V2 is the voltage lost due to resistive losses across the chain of connectors 240. The resistive loss V2 is proportional to the total number of connectors 240 comprising the chain of connectors 240. Connectors 240 are further described below in conjunction with FIG. 3.

In FIG. 2A, the plurality of connectors 240 (e.g., four) are coupled, in series, together to form a chain that electrically links the terminals 260a and 260b. In FIG. 2A, the four connectors 240 span the horizontal length of the shell 220 along the horizontal dimension 250 such that the connectors 240 make a low resistance electrical connection with terminals 260a and 260b. In one or more embodiments, the application of a tension 214 results in an increase in the spacing between each adjacent connector. The connectors 240 are further described below in conjunction with FIGS. 3A and 3B.

Each terminal 260a and 260b is composed of a high conductivity material, such as copper. Each terminal 260a and 260b may additionally be a non-conductive material coated with a thin layer of gold or other high conductivity material. The terminals 260a and 260b are configured to enable the application and/or measurement of a voltage, current, and resistance, across the deformable signaling pathway 200. In various embodiments, each terminal is attached to a conductive thread 265. The conductive thread 265 passes through the shell 220 and forms a low resistance electrical contact with a connector 240.

Figure 2B:
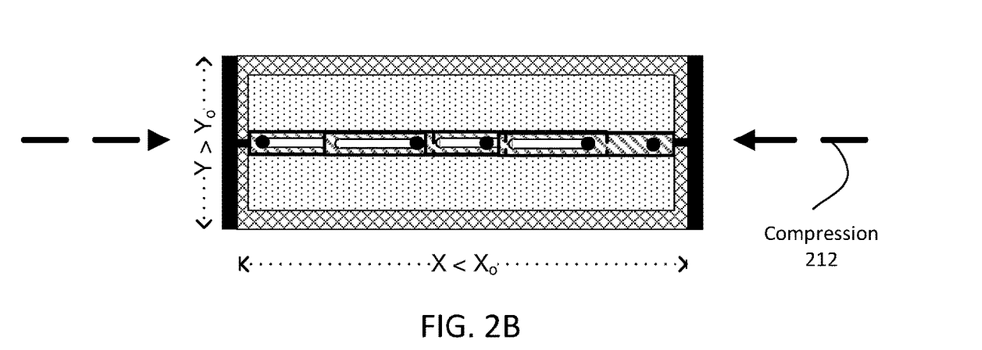
FIG. 2B shows the deformable signaling pathway depicted in FIG. 2A deformed by a compression, in accordance with an embodiment.

FIG. 2B shows the deformable signaling pathway 200 depicted in FIG. 2A deformed by compression 212, in accordance with an embodiment. As illustrated in FIG. 2B, the compression 212 is incident upon terminal 260a and 260b in a direction parallel to the horizontal dimension 250 and is configured to push the two terminals 260a and 260b of the deformable signaling pathway 200 towards one another. In FIG. 2B, the compression 212 causes the horizontal length of the deformable signaling pathway 200 to decrease along the horizontal dimension 250 such that the resultant horizontal length of the deformable signaling pathway 200 is less than the nominal horizontal length $X_o$. The reduction in the horizontal length of the deformable signaling pathway 200 is typically associated with a corresponding increase in its vertical length. For example, in FIG. 2B, a horizontal length less than the nominal horizontal length $X_o$ is associated with a vertical length greater than the nominal vertical length $Y_o$.

Similar to FIG. 2A, in FIG. 2B the application of a compression 212 results in a decrease in horizontal length and the generation of restoring forces along the shell 220. The generated restoring forces are configured to return the deformable signaling pathway 200 to its original size and shape (e.g., when no compression 212 was applied). In one or more embodiments, a decrease in the horizontal length of the deformable signaling pathway 200 is associated with an increase in its vertical length. In an embodiment, the increase in vertical length is proportional to the decrease in horizontal length. That is, the generated restoring forces act to return the shell 220 to its original size and shape when compressed by the compression 212. Generally, the application of a compression 212 results in a reduction of the distance between adjacent connectors 240. For example, in FIG. 2B, distance between each of the adjacent connectors 240 is at its minimal value. It should be noted that in FIG. 2B, the four connectors 240 form a low resistance electrical contact between terminals 260a and 260b.

Figure 2C:
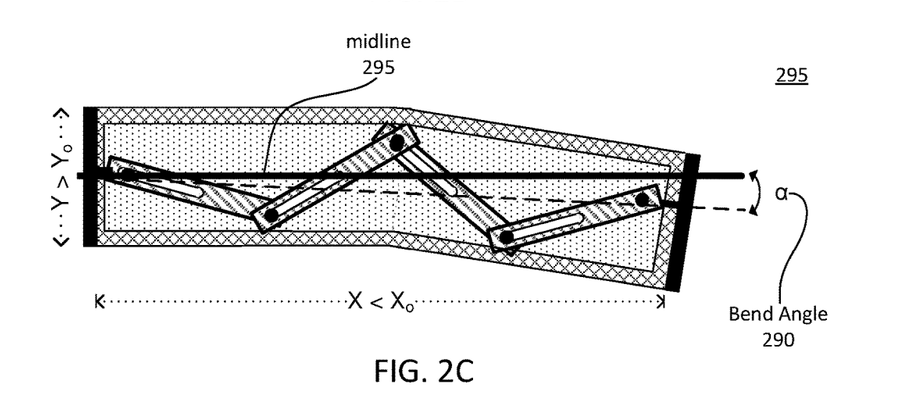
FIG. 2C shows the deformable signaling pathway of FIG. 2A being bent by an angle α away from the midline of the deformable signaling in accordance with an embodiment.

FIG. 2C shows the deformable signaling pathway 200 of FIG. 2A being bent by a bend angle (α) 290 away from a midline 295 of the deformable signaling pathway 200 in accordance with an embodiment. In FIG. 2C a bend of an angle α 290 away from the midline 295 generates restoring forces to counteract the induced bend. That is, the restoring forces are directed in directions that would restore the deformable signaling pathway 200 to its original size and shape. In FIG. 2C, the deformable signaling pathway 200 has a horizontal length less than the nominal horizontal length $X_o$ and a vertical length larger than the nominal vertical length $Y_o$. The application of any combination of stresses and/or strains (e.g., compression, tension, shear, bending, and torsion) causes the chain of one or more connectors 240 to move in relation to one another in order to maintain an electrical contact between terminals 260a and 260b. For example, in FIG. 2C, a bend of an angle α 290 away from the midline 295 of the deformable signaling pathway 200, may cause adjacent connectors 240 to rearrange themselves with respect to one another in order to span the length of the shell 220 and maintain electrical contact between terminals 260a and 260b. In other embodiments, the plurality of connectors 240 rotate in relation to one another such that they form different patterns in order to span the horizontal length of the deformable signaling pathway 200. Possible rotations of individual connectors 240 are further described below in conjunction with FIG. 3.

Under a combination of stresses and strains caused by a bend of an angle α, the deformable signaling pathway 200 maintains electrical contact between terminals 260a and 260b via the connectors 240.

Figure 3B:
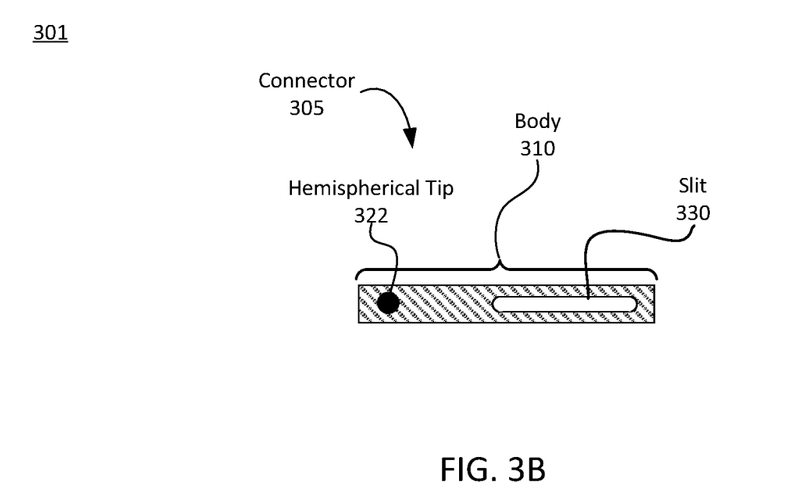
FIG. 3B is a top-down view of the connector of FIG. 3A in accordance with an embodiment.

FIGS. 3A and 3B both illustrate a side-view 300 and a top-down view 301 of a connector 305 in accordance with an embodiment. Here, the connector 305 is an embodiment of the connector 240. FIG. 3A is a side-view 300 of a connector 305 in accordance with an embodiment. The connector 305 is an embodiment of a connector 240. The connector 240 includes a body 310 and a mechanical fastener 320 attached at one end to the body 310. In an embodiment, the body 310 is flexible. For example in one or more example embodiments, both the body 310 and mechanical fastener 320 are constructed out of a flexible electrically insulating polyamide material electroplated with highly conductive compound. In another example embodiment, the body 310 is a KAPTON sheet electroplated with a thin layer of gold. In other embodiments, the body 310 is rigid.

The mechanical fastener 320 is comprised of a hemispherical tip 322 attached to a cylindrical shaft 324. In various embodiments, one end of the cylindrical shaft 324 is fused to the body 310 while the other end of the cylindrical shaft 324 is fused to the hemispherical tip 322. Typically, the diameter of the hemispherical tip 322 is larger than the diameter of the shaft.

FIG. 3B is a top-down view 301 of the connector 305 of FIG. 3A in accordance with an embodiment. FIG. 3B depicts the hemispherical tip 322 and a slit 330 associated with the connector 305. Typically, two or more connectors 305 may be attached to one another by threading the mechanical fasteners 320 of each connector 305 through the slit 330 of its adjacent connector 305. For example, two connectors (e.g., two connectors 305) are coupled to one another by threading the mechanical fastener 320 of a first connector through a slit of a second connector. Two connectors coupled in this way have two degrees of freedom in terms of the available motion. In the embodiment described in the previous example, the second connector can rotate 360 with respect to the first connector. In another example embodiment, the second mechanical connector can translate along the length of the slit 330 associated with the first mechanical. Thus, in an embodiment, a chain comprising a plurality of connectors 305 can be made arbitrarily long by repeatedly coupling connectors together in the manner described above.

In various embodiments, the diameter of the slit 330 is approximately equal to or less than the diameter of the cylindrical shaft 324 while the diameter of the hemispherical tip 322 is larger than the diameter of the cylindrical shaft 324. Thus, threading the mechanical fastener 320 of each connector 305 of the two or more connectors 305 through the slit 330 of its adjacent connector 305 may allow the two or more connectors 305 to freely slide relative to one another along the slit 330 while maintaining electrical contact. Such an arrangement may enable the formation of a reliable electrical connection between the terminals of deformable signaling pathway 120 as depicted above in conjunction with FIGS. 2A-2C.

Figure 4A:
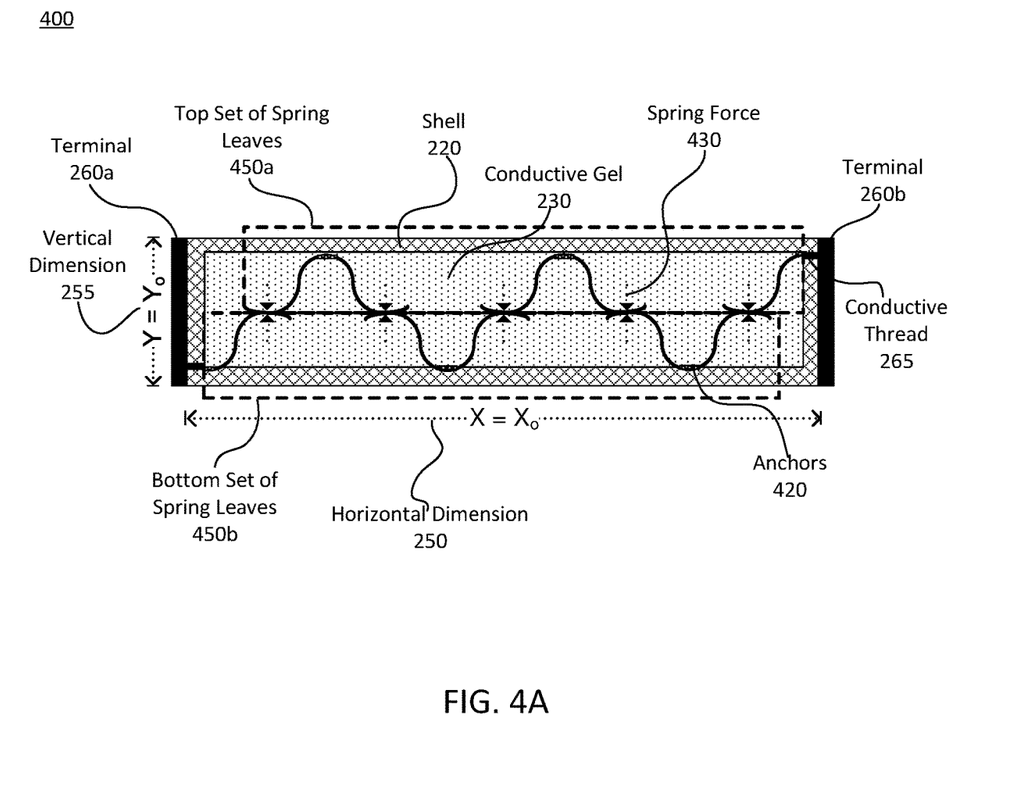
FIG. 4A illustrates a side-view of a single deformable signaling pathway at equilibrium, in accordance with an embodiment.
Figure 4B:
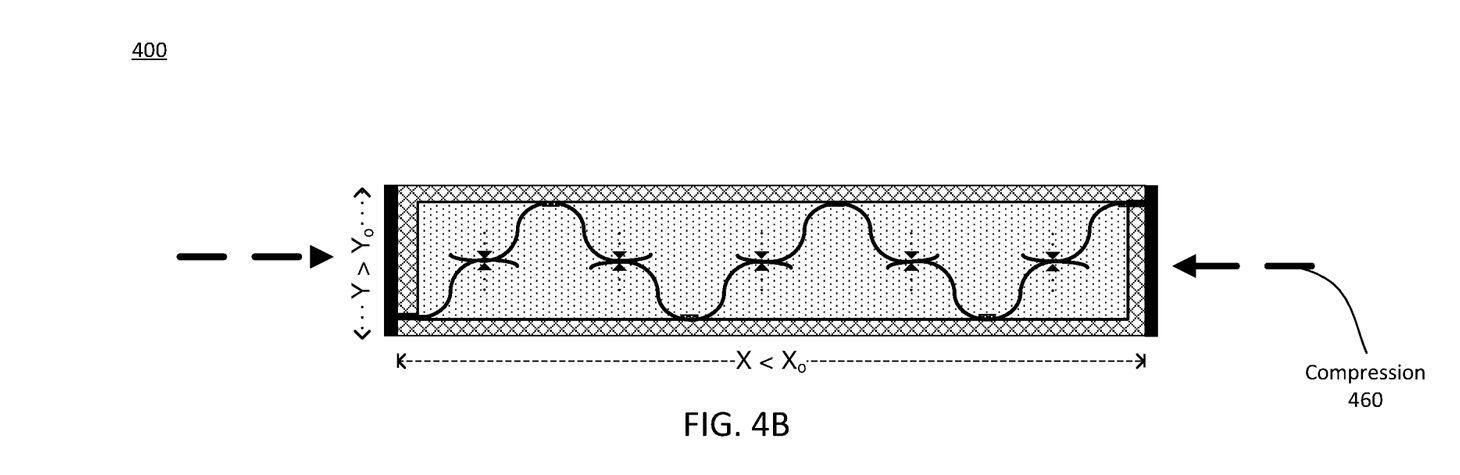
FIG. 4B illustrates a side-view of a single deformable signaling pathway when deformed due to a compression, in accordance with an embodiment.
Figure 4C:
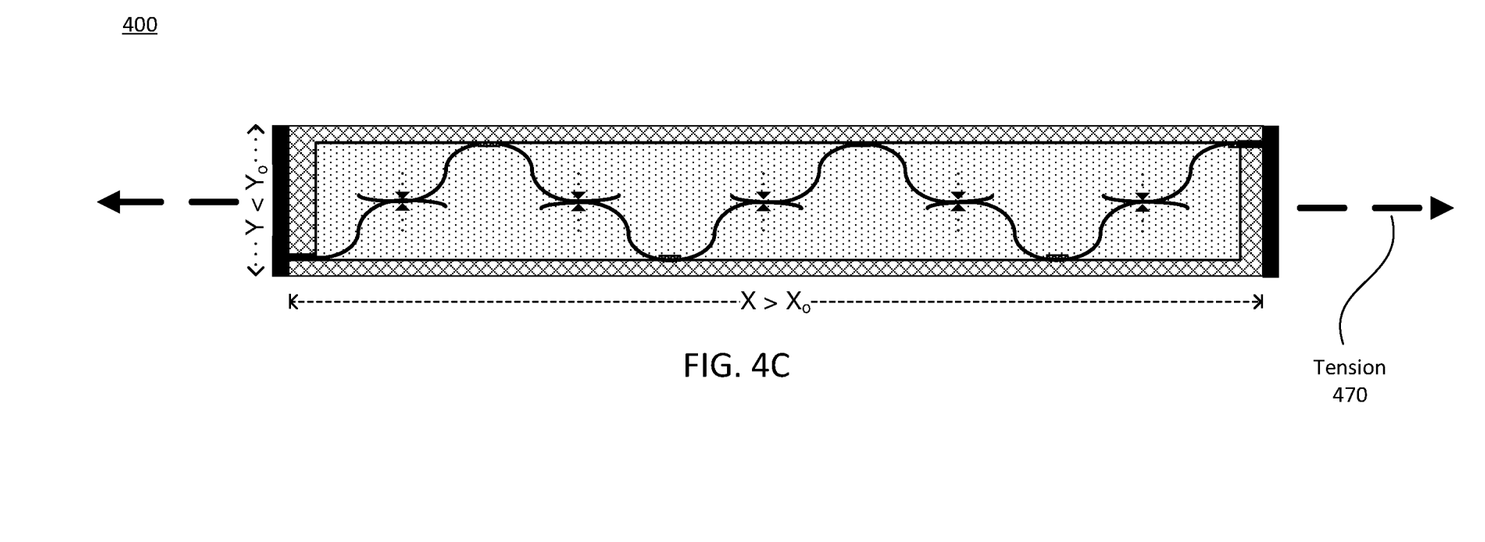
FIG. 4C depicts a deformable signaling pathway when deformed due to a tension, in accordance with an embodiment.

FIG. 4A illustrates a side-view of a single deformable signaling pathway 400 at equilibrium, in accordance with an embodiment. Here, a deformable signaling pathway 400 is an embodiment of deformable signaling pathway 120 described above in conjunction with FIG. 1. In the absence of an applied stress or strain, the deformable signaling pathway 400 is understood to be at equilibrium. As shown in FIG. 4A, at equilibrium, the deformable signaling pathway 400 has a nominal horizontal length $X_o$ and a nominal vertical length $Y_o$. The deformable signaling pathway 400 includes a shell 220, a conductive gel 230, terminal 260a and terminal 260b, a top and bottom set of spring leaves 450a-b, and anchors 420. Embedded within the conductive gel 230, are a set of top and bottom spring leaves 450a and 450b configured to enable a low resistance electrical contact between terminals 260a and 260b via the conductive thread 265. FIGS. 4B and 4C, further described below, illustrate a deformable signaling pathway 400 is undergoing a compression and tension, respectively.

The top and bottom set of spring leaves 450a and 450b, together, form a low resistance electrical connection between terminals 260a and 260b. Each set of spring leaves 450a and 450b comprise one or more individual U-shaped conductive elements. For example, in FIG. 4A, both the top and bottom set of spring leaves 450a and 450b each include at least two U-shaped conductive elements. In various embodiments, the spring leaves 410 comprise a polymer with good spring qualities (e.g., KAPTON). Spring qualities include spring constant. In one example embodiment, the top and bottom set of spring leaves 450a and 450b are both constructed of KAPTON bent into a U-shape and coated with gold. In the example embodiment depicted in FIG. 4A each of the individual U-shaped conductive elements associated with one of the top or bottom set of spring leaves 450a and 450b are anchored to the shell 220 through anchors 420. In one or more embodiments, the anchors 420 mechanically attach the top and bottom set of spring leaves 450a and 450b to the top and bottom walls of the shell 220, respectively. In this way, the application of a deformation on the shell 220 results in a corresponding deformation of the top and bottom set of spring leaves 450a and 450b. The behavior of the spring leaves when the deformable signal pathway 400 is deformed due to an applied force (e.g., compression, tension, etc.) is further described below in conjunction with FIGS. 4B and 4C.

The spring leaves 450a and 450b are held in mechanical contact to one another through spring forces 430. Typically, the formation of a mechanical contact results in the formation of an electrical contact between the top and bottom set of spring leaves 450a-b. For example, current applied to the deformable signaling pathway through terminal 260a propagates to terminal 260b along the top and bottom set of spring leaves 450a and 450b. Similarly, in another example, if a voltage V1 is applied to terminal 260a, terminal 260b is also charged to the voltage V1. In the example above it should be noted that if both terminal 260a and terminal 260b are charged to a voltage V1, the conductive thread 265 and the top and bottom set of spring leaves 450a and 450b are also charged to the voltage V1. In other embodiments, there may be some restive loss across the conductive thread 265, and the top and bottom set of spring leaves 450a and 450b. For example, the resistance of each U-shaped element is a value between 0Ω and a 1,000Ω. That is, if terminal 260a is charged to a voltage V1, terminal 260b is charged to a voltage V1-V2 where V2 is the voltage lost due to resistive losses across the top and bottom set of spring leaves 450a and 450b. The resistive loss V2 is proportional to the total number of U-shaped elements comprising the top and bottom set of spring leaves 450a and 450b.

FIG. 4B illustrates a side-view of a single deformable signaling pathway 400 that is deformed due to a compression 460, in accordance with an embodiment. The compression 460 is directed along the horizontal dimension 250. In FIG. 4B, the external compressive stress 460 results in a decrease of the horizontal length of the deformable signaling pathway 400 such that the resultant horizontal length is less than the nominal horizontal length $X_o$. A decrease in horizontal length of the deformable signaling pathway 400 is associated with a compression in each of the individual U-shaped elements. That is, each of the individual U-shaped elements comprising a set of spring leaves (e.g., top set of spring leaves 450a and bottom set of spring leaves 450b) are closer together when the deformable signaling pathway is compressed. In one or more embodiments, a compression of the deformable signaling pathway 400 along the horizontal dimension 250 is associated with an increase of the vertical length of the deformable signaling pathway 400 along the vertical dimension 255.

As shown in FIG. 4B, a decrease in the horizontal length of the deformable signaling pathway 400 generates, restoring forces on the shell 220. In FIG. 4B the generated restoring forces work to return the deformable signaling pathway 400 to its original size and shape. In one or more embodiments, the magnitude of the generated restoring forces is related to a magnitude of the deformation 460. That is, the generated restoring forces are configured to return the shell 220 to its original size and shape.

FIG. 4C depicts a deformable signaling pathway 400 that is deformed due to tension 470, in accordance with an embodiment. The tension 470 results in an increase in the horizontal length of the deformable signaling pathway 400 such that the horizontal length is larger than the nominal horizontal length $X_o$. In various embodiments, an increase in the horizontal length of the deformable signaling pathway 400 is associated with a corresponding decrease in its vertical length. Generally, the horizontal length of the deformable signaling pathway 400 is inversely related to its vertical length. The application of tension 470 results in the generation of restoring along the shell 220. The generated restoring forces are configured to return the deformed deformable signaling pathway 400 to its original size and shape.

HMD System Overview

Figure 5:
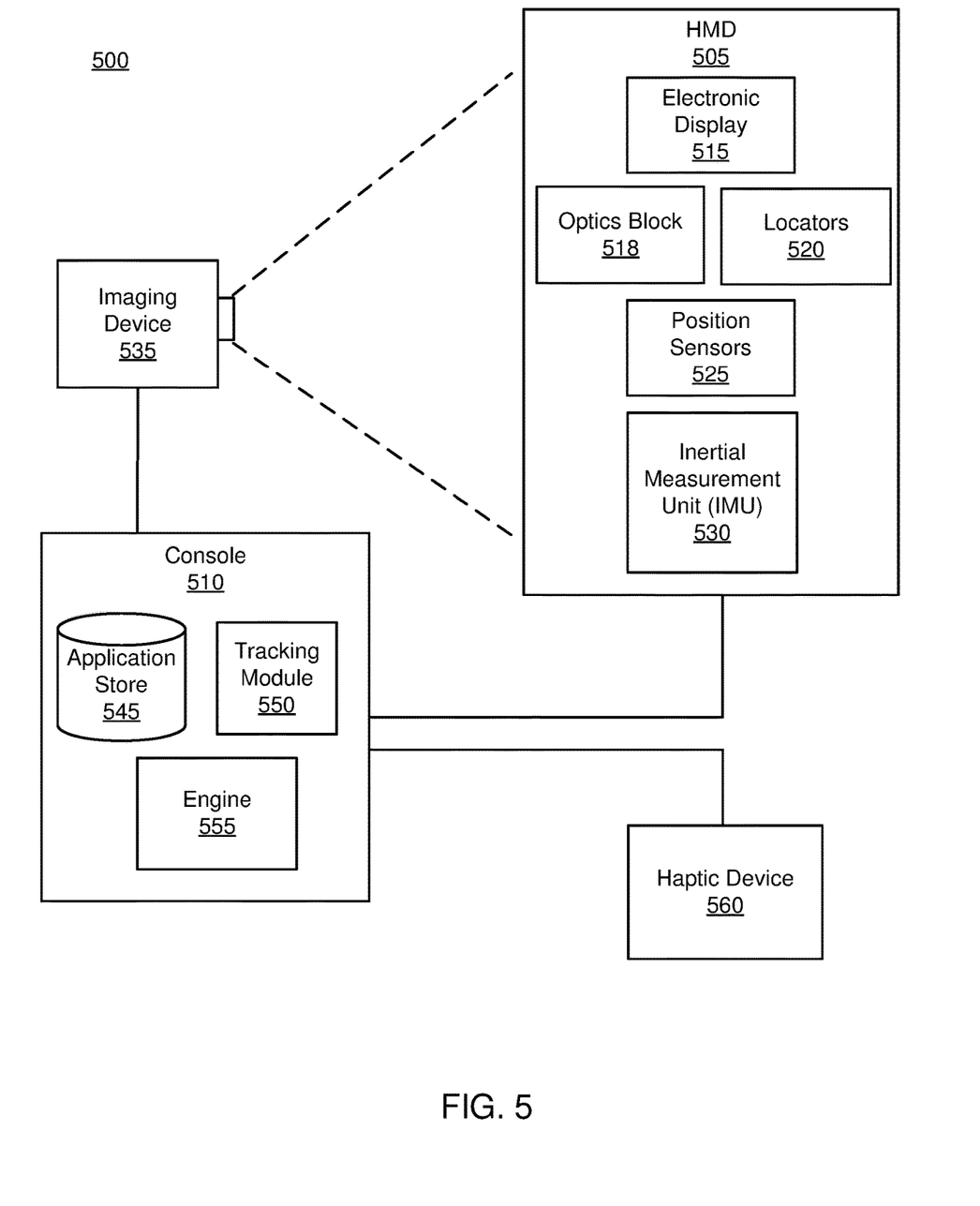
FIG. 5 is a block diagram of a system environment including a VR system, in accordance with an embodiment.

FIG. 5 is a block diagram of a system 500 including a haptic device 560 comprising a digital processing unit (DSP), in accordance with one embodiment. The system 500 may operate in an artificial reality environment, or some combination thereof. The system comprises a head-mounted display (HMD) 505, an imaging device 535, and the haptic device 560 that are each coupled to a console 510. While FIG. 5 shows an example system 500 including one Head Mounted Display (HMD) 505, one imaging device 535, and 1 haptic device 560, in other embodiments any number of these components may be included in the system 500. For example, there may be multiple HMDs 505 each having an associated haptic device 560 each of which is monitored by one or more imaging devices 535. Here, each HMD 505, haptic device 560, and imaging devices 535 communicating with the console 510. In alternative configurations, different and/or additional components may be included in the system environment 500. Additionally, in some embodiments the system 500 is modified to include other system environments, such as a VR, AR system environment, or any combination thereof.

The HMD 505 is a head-mounted display that presents media to a user. Examples of media presented by the HMD 505 include one or more images, video, audio, or some combination thereof. In some embodiments, audio is presented via an external device (e.g., speakers and/or headphones) that receives audio information from the HMD 505, the console 510, or both, and presents audio data based on the audio information. The HMD 505 may comprise one or more rigid bodies, which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other. In some embodiments, the HMD 505 may also act as an artificial reality headset. In these embodiments, the HMD 505 augments views of a physical, real-world environment with computer-generated elements (e.g., images, video, and sound).

The HMD 505 includes an electronic display 515, an optics block 518, one or more locators 520, one or more position sensors 525, and an inertial measurement unit (IMU) 530.

The optics block 518 magnifies received light from the electronic display 515, corrects optical errors associated with the image light, and the corrected image light is presented to a user of the HMD 505. An optical element may be an aperture, a Fresnel lens, a convex lens, a concave lens, a filter, or any other suitable optical element that affects the image light emitted from the electronic display 515. Moreover, the optics block 518 may include combinations of different optical elements. In some embodiments, one or more of the optical elements in the optics block 518 may have one or more coatings, such as anti-reflective coatings.

The locators 520 are objects located in specific positions on the HMD 505 relative to one another and relative to a specific reference point on the HMD 505. A locator 520 may be a light emitting diode (LED), a corner cube reflector, a reflective marker, a type of light source that contrasts with an environment in which the HMD 505 operates, or some combination thereof. In embodiments where the locators 520 are active (i.e., an LED or other type of light emitting device), the locators 520 may emit light in the visible band (~380 nm to 550 nm), in the infrared (IR) band (~750 nm to 1 mm), in the ultraviolet band (10 nm to 380 nm), some other portion of the electromagnetic spectrum, or some combination thereof.

In some embodiments, the locators 520 are located beneath an outer surface of the HMD 505, which is transparent to the wavelengths of light emitted or reflected by the locators 520 or is thin enough to not substantially attenuate the wavelengths of light emitted or reflected by the locators 520. Additionally, in some embodiments, the outer surface or other portions of the HMD 505 are opaque in the visible band of wavelengths of light. Thus, the locators 520 may emit light in the IR band under an outer surface that is transparent in the IR band but opaque in the visible band.

The IMU 530 is an electronic device that generates fast calibration data based on measurement signals received from one or more of the position sensors 525. A position sensor 525 generates one or more measurement signals in response to motion of the HMD 505. Examples of position sensors 525 include one or more accelerometers, one or more gyroscopes, one or more magnetometers, another suitable type of sensor that detects motion, a type of sensor used for error correction of the IMU 530, or some combination thereof. The position sensors 525 may be located external to the IMU 530, internal to the IMU 530, or some combination thereof.

Based on the one or more measurement signals from one or more position sensors 525, the IMU 530 generates fast calibration data indicating an estimated position of the HMD 505 relative to an initial position of the HMD 505. For example, the position sensors 525 include multiple accelerometers to measure translational motion (forward/back, up/down, left/right) and multiple gyroscopes to measure rotational motion (e.g., pitch, yaw, and roll). In some embodiments, the IMU 530 rapidly samples the measurement signals and calculates the estimated position of the HMD 505 from the sampled data. For example, the IMU 530 integrates the measurement signals received from the accelerometers over time to estimate a velocity vector and integrates the velocity vector over time to determine an estimated position of a reference point on the HMD 505. Alternatively, the IMU 530 provides the sampled measurement signals to the console 510, which determines the fast calibration data. The reference point is a point that may be used to describe the position of the HMD 505. While the reference point may generally be defined as a point in space; however, in practice the reference point is defined as a point within the HMD 505 (e.g., a center of the IMU 530).

The IMU 530 receives one or more calibration parameters from the console 510. As further discussed below, the one or more calibration parameters are used to maintain tracking of the HMD 505. Based on a received calibration parameter, the IMU 530 may adjust one or more IMU parameters (e.g., sample rate). In some embodiments, certain calibration parameters cause the IMU 530 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 535 generates slow calibration data in accordance with calibration parameters received from the console 510. Slow calibration data includes one or more images showing observed positions of the locators 520 that are detectable by the imaging device 535. The imaging device 535 may include one or more cameras, one or more video cameras, any other device capable of capturing images including one or more of the locators 520, or some combination thereof. Additionally, the imaging device 535 may include one or more filters (e.g., used to increase signal to noise ratio). The imaging device 535 is designed to detect light emitted or reflected from locators 520 in a field of view of the imaging device 535. In embodiments where the locators 520 include passive elements (e.g., a retroreflector), the imaging device 535 may include a light source that illuminates some or all of the locators 520, which retro-reflect the light towards the light source in the imaging device 535. Slow calibration data is communicated from the imaging device 535 to the console 510, and the imaging device 535 receives one or more calibration parameters from the console 510 to adjust one or more imaging parameters (e.g., focal length, focus, frame rate, ISO, sensor temperature, shutter speed, aperture).

Based on the one or more measurement signals from the controller 130, the console 510 may send on or more instructions to the haptic device 560. For example, the console 510 may send instructions comprising the operation of one or more electrical devices associated with the haptic device 560 (e.g., actuators, motors, vibrators). In some embodiments, the console 510 rapidly samples the measurement signals received from the haptic device 560 and calculates a current state of the haptic device 560 from the sampled data. In other embodiments, the haptic device 560 provides the sampled measurement signals to the console 510, which determines and provides one or more calibration instructions to the haptic device 560.

The haptic device 560 is a device that allows the console 510 to communicate with one or more other haptic devices 560. In one or more embodiments, the haptic device is the wearable accessory 100 including a DSP module. In still other embodiments, the haptic device 560 is a combination of one or more wearable accessories 100. The wearable accessory 100 is further described above in conjunction with FIG. 1.

The console 510 provides media to the HMD 505 for presentation to the user in accordance with information received from one or more of: the imaging device 535, the HMD 505, and the haptic device 560. In the example shown in FIG. 5, the console 510 includes an application store 545, a tracking module 550, and a VR engine 555. Some embodiments of the console 510 have different modules than those described in conjunction with FIG. 5. Similarly, the functions further described below may be distributed among components of the console 510 in a different manner than is described here.

The application store 545 stores one or more applications for execution by the console 510. An application is a group of instructions, that when executed by a processor, generates content for presentation to the user. Content generated by an application may be in response to inputs received from the user via movement of the HMD 505 or the haptic device 560. Examples of applications include gaming applications, conferencing applications, video playback application, or other suitable applications.

The tracking module 550 calibrates the system 500 using one or more calibration parameters and may adjust one or more calibration parameters to reduce error in determination of the position of the HMD 505. For example, the tracking module 550 adjusts the focus of the imaging device 535 to obtain a more accurate position for observed locators on the HMD 505. Moreover, calibration performed by the tracking module 550 also accounts for information received from the IMU 530. Additionally, if tracking of the HMD 505 is lost (e.g., the imaging device 535 loses line of sight of at least a threshold number of the locators 520), the tracking module 550 re-calibrates some or the entire system environment 500.

The tracking module 550 tracks movements of the HMD 505 using slow calibration information from the imaging device 535. The tracking module 550 determines positions of a reference point of the HMD 505 using observed locators from the slow calibration information and a model of the HMD 505. The tracking module 550 also determines positions of a reference point of the HMD 505 using position information from the fast calibration information. Additionally, in some embodiments, the tracking module 550 may use portions of the fast calibration information, the slow calibration information, or some combination thereof, to predict a future location of the headset 505. The tracking module 550 provides the estimated or predicted future position of the HMD 505 to the Engine 555.

The engine 555 executes applications within the system environment 500 and receives position information, acceleration information, velocity information, predicted future positions, or some combination thereof of the HMD 505 from the tracking module 550. Based on the received information, the engine 555 determines content to provide to the HMD 505 for presentation to the user. For example, if the received information indicates that the user has looked to the left, the engine 555 generates content for the HMD 505 that mirrors the user's movement in a virtual environment. Additionally, the engine 555 performs an action within an application executing on the console 510 in response to an action request received from the haptic device 560 and provides feedback to the user that the action was performed. The provided feedback may be visual or audible feedback via the HMD 505 or haptic feedback via one or more electrical devices attached to the haptic device 560 (e.g., actuators, vibrators, etc.).

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A deformable signaling pathway comprising:
    a plurality of connectors configured to form an electrical connection between a first terminal and a second terminal; and
    a shell encasing a conductive gel that surrounds each of the plurality of connectors, and the first terminal and the second terminal are external to the shell.

2. The deformable signaling pathway of claim 1, wherein the conductive gel suspends a number of conductive particles.

3. The deformable signaling pathway of claim 1, wherein the shell encasing the conductive gel is configured to impart restoring forces to return the shell to its original size and shape.

4. The deformable signaling pathway of claim 1, wherein each connector of the plurality of connectors is coupled to an adjacent connector of the plurality of connectors forming a conductive chain of connectors.

5. The deformable signaling pathway of claim 1, wherein each connector of the plurality of connectors comprises:
   a body coated with an electrical conductor comprising a slit with a first diameter; and
   a mechanical fastener comprising a cylindrical shaft coupled to the body with a second diameter and a hemispherical tip coupled to the cylindrical shaft with a third diameter, wherein the second diameter is larger than or equal to the third diameter and the second diameter is less than or equal to the first diameter.

6. The deformable signaling pathway of claim 5, wherein the fastener of each connector of the plurality of connectors is threaded through the slit of an adjacent connector.

7. The deformable signaling pathway of claim 5, wherein each connector of the plurality of connectors can freely slide relative to an adjacent connector along the slit.

8. The deformable signaling pathway of claim 1, wherein a first connector of the plurality of connectors is connected to the first terminal and a second connector of the plurality of connectors is connected to the second terminal through the shell.

9. The deformable signaling pathway of claim 1, wherein the deformable signaling pathway is part of a wearable device.

10. The deformable signaling pathway of claim 9, wherein the wearable device is a glove.

11. The deformable signaling pathway of claim 9, wherein a controller is further configured to:
   measure the resistance of the deformable signaling pathway; and
   store the measured resistance.

12. The deformable signaling pathway of claim 9, wherein a controller is configured to:
   determine a calibration parameter for the deformable signaling pathway in the wearable device; and
   store the determined calibration parameter.

13. A deformable signaling pathway comprising:
   a top set of spring leaves and a bottom set of spring leaves configured to form an electrical connection between a first terminal and a second terminal; and
   a shell encasing a conductive gel that surrounds each of the top set of spring leaves and the bottom set of spring leaves, and the first terminal and the second terminal are external to the shell.

14. The deformable signaling pathway of claim 13, wherein the top set of spring leaves and the bottom set of spring leaves each comprise one or more conductive elements with spring qualities.

15. The deformable signaling pathway of claim 14, wherein the one or more conductive elements are a conductive polymer bent into a U-shape.

16. The deformable signaling pathway of claim 14, wherein a first conductive element of the one or more conductive elements is coupled to the first terminal and a second conductive element of the one or more conductive elements is coupled to the second terminal.

17. The system of claim 13, wherein the shell encasing the conductive gel is configured to impart restoring forces to return the shell to its original size and shape.

18. The deformable signaling pathway of claim 13, wherein the deformable signaling pathway is part of a wearable device.

19. The deformable signaling pathway of claim 18, wherein the wearable device is a glove.

20. The deformable signaling pathway of claim 18, wherein a controller is further configured to:
   measure the resistance of the deformable signaling pathway; and
   store the measured resistance.

* * * * *